United States Patent Office 2,921,952
Patented Jan. 19, 1960

2,921,952
THIOSULFATE PROCESS

Edward L. Doerr and Van R. Gaertner, Dayton, Ohio, assignors to Monsanto Chemical Company, St. Louis, Mo., a corporation of Delaware No Drawing. Application July 23, 1956
Serial No. 599,346

5 Claims. (Cl. 260—453)

The present invention relates to the preparation of alkyl thiosulfates and more particularly provides a new and improved method for the preparation of alkali metal or ammonium alkyl thiosulfates having from 8 to 18 carbon atoms in the alkyl radical.

Compounds of the formula $R.S.SO_3Na$ where R denotes an organic radical have been stated in the Henkel et al. British Patent No. 417,965, to be obtainable by the reaction of mercaptans RSH with a complex of pyridine and sulfur trioxide. This procedure is not of commercial interest in that it gives low yields while involving the use of the expensive pyridine. Moreover, we have found that when pyridine is omitted in the sulfur trioxide process, no water-soluble surfactant is formed.

Now we have found that very good yields of the higher alkyl thiosulfates are obtained by the reaction of a $C_8$ to $C_{18}$ alkyl mercaptan with chlorosulfonic acid and subsequent neutralization with an inorganic alkaline agent, substantially according to the scheme:

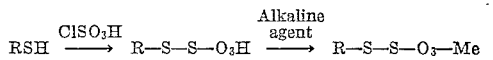

in which R is an alkyl radical of from 8 to 18 carbon atoms and Me denotes a salt forming anion. As alkaline agents there are employed, e.g., metal or ammonium hydroxides or the basic salts thereof, e.g., the oxides or carbonates. Particularly valuable are the alkali metal or ammonium hydroxides or carbonates, e.g., potassium hydroxide, lithium hydroxide, sodium carbonates, etc.

Alkyl mercaptans useful for the preparation of the present thiosulfates are, e.g., the n-octyl, the tert-octyl, the 2-ethylhexyl, the n-nonyl, the n-decyl, the 2-n-propylheptyl, the n-undecyl, the 2-butyloctyl, the 5-ethylnonyl, the 2,6,8-trimethyl-4-nonyl, the n-dodecyl, the tert-dodecyl, the n-tridecyl, the 7-ethyl-2-methylundecyl, the n-tetradecyl, the n-pentadecyl, the n-hexadecyl, and the n-octadecyl mercaptans. Of economic importance are the higher alkyl mercaptans in which the alkyl radical is derived from alcohols obtained according to the "Oxo" process by the reaction of a lower olefin dimer, trimer or tetramer with carbon monoxide and hydrogen under high pressure, or the alkyl mercaptans prepared by addition of hydrogen sulfide to propylene and butylene polymers.

Reaction of the alkyl mecaptan with the chlorosulfonic acid takes place by contacting the two reactants in the presence of an inert liquid diluent at ordinary or moderately decreased or moderately increased temperatures, e.g., at temperatures of from minus 10° to 80° C. As diluents there may be used generally organic liquids which are inert under the reaction conditions, e.g., ethyl or isopropyl ether, chloroform, carbon tetrachloride, hexachloroethane, dioxane, etc. For easy separation of the product it is convenient to operate in the presence of a diluent which boils at a temperature which is below the boiling points of the reactants. Before neutralizing the mono-acid free alkyl thiosulfate which is formed by reacting the mercaptan with the chlorosulfonic acid as shown in the above reaction scheme, it is advantageous, but not necessary, substantially to separate the diluent from the reaction mixture, e.g., by distillation. The residue, which comprises the mono-acid alkyl thiosulfate, is neutralized by treatment with sodium, potassium, lithium or ammonium hydroxide, depending upon the alkyl thiosulfate salt which is desired. In order to facilitate removal of the by-product alkali metal or ammonium chloride formed by neutralization of the by-product hydrogen chloride, the neutralizing step may be conducted in the presence of an organic diluent in which the by-product salt is insoluble. This by-product, however, may be separated by other isolating procedures known to the art.

Generally, the product obtained after stripping of diluent and separation of the by-product salt consists essentially of the alkyl thiosulfate salt, particularly when the alkyl mercaptan and the chlorosulfonic acid have been employed in substantially equimolar proportions. The alkyl thiosulfate salt thus obtained may be employed directly as a surfactant. However, a purer product can be obtained by repeated washing with an organic solvent. The crude product may also be readily purified by recrystallization, e.g., from a hot organic solvent or by dissolution and concentration.

Since one mole of chlorosulfonic acid is needed to react with one mole of the alkyl mercaptan in order to give the mono-acid alkyl thiosulfates, these reactants are preferably employed in such proportions. However, an excess of either reactant may be used, said excess being separable from the reaction product prior to or during the neutralization and isolation steps. The nature of the inert diluent somewhat determines the reaction temperature employed. Thus, usually when using ether as a diluent, temperatures of from 0° C., to 10° C. are recommended. When employing the low-boiling diluents with some of the highly reactive mercaptans whose use results in an exothermal reaction, it is advisable to employ external cooling.

The alkyl thiosulfate salts prepared according to the invention are generally useful as surfactants. As disclosed in our copending application, Serial No. 599,347, filed of even date, branched chain hexadecyl thiosulfate is characterized by outstanding foaming property. The invention is further illustrated, but not limited, by the following examples.

Example 1

To a solution of 96.6 g. of tert-dodecyl mercaptan dissolved in approximately 500 ml. of ether there was added drop-wise with ice cooling, 68.4 g. of chlorosulfonic acid dissolved in 90 ml. of ether during a period of 16 minutes at a temperature of 3–5° C. The resulting solution was stirred, with ice-bath cooling, for 30 minutes. After stripping off the ether under water pump vacuum the residue was poured into a dilute ethanol-sodium hydroxide solution in order to neutralize it. To the neutralized product there was then added an excess of ethanol and the inorganic salts which were precipitated thereby were filtered off. The solvent was stripped off from the filtrate under reduced pressure to leave as residue an acetone-soluble pasty material. Upon cooling an acetone solution of said material a solid formed which was filtered off. This solid comprised the substantially pure sodium tert-dodecyl thiosulfate.

Example 2

Into a one-liter reactor equipped with a dropping funnel, thermometer and drying tube there were charged 500 ml. of ether and 50.6 g. of n-dodecyl mercaptan. A sulfation mixture which had been prepared by adding 34.2 g. of chlorosulfonic acid to 50 ml. of ether (while cooling on an ice-bath), was added during 10 minutes at a temperature of 5°–7° C. to the mixture of dodecyl mercaptan and ether. The resulting clear solution was stirred for 30 minutes at a temperature of 2° C. After stripping off the ether under water pump vacuum the residue was poured into a 50% aqueous ethanol solution of sodium hydroxide in order to neutralize it (pH slightly over 7.0). The whole was then heated to boiling and filtered while hot. Upon cooling, the crystallized product which formed in the filtrate was removed and recrystallized from 50% aqueous ethanol. Washing of the crystals with cold ethanol and drying in the vacuum oven at a temperature of 40° C. gave 40.6 g. of the substantially pure n-dodecyl thiosulfate, analyzing 20.75% sulfur as against 21.07% the calculated value.

What we claim is:

1. The method which comprises contacting, at a temperature of from minus 10° to 80° C., and in the presence of an inert liquid diluent, an alkyl mercaptan having from 8 to 18 carbon atoms in the alkyl radical with chlorosulfonic acid in the presence of an inert liquid diluent neutralizing the resulting reaction product with an alkaline reagent selected from the class consisting of alkali metal and ammonium hydroxides, and recovering from the resulting neutralized reaction product a salt selected from the class consisting of alkali metal and ammonium alkyl thiosulfates having from 8 to 18 carbon atoms in the alkyl radical.

2. The method which comprises contacting at a temperature of from minus 10° C. to 80° C. and in the presence of an inert liquid diluent an alkyl mercaptan having from 8 to 18 carbon atoms in the alkyl radical with chlorosulfonic acid, substantially separating the diluent from the resulting reaction product to obtain a residue, neutralizing the residue with an alkali metal hydroxide, and recovering from the neutralized residue an alkali metal alkyl thiosulfate having from 8 to 18 carbon atoms in the alkyl radical.

3. The method which comprises contacting an alkyl mercaptan having from 8 to 18 carbon atoms in the alkyl radical with chlorosulfonic acid in the presence of diethyl ether as a diluent and at a temperature which is below the boiling point of the ether, substantially separating the ether from the resulting reaction product to obtain a residue, neutralizing the residue with an alkali metal hydroxide, and recovering from the neutralized residue an alkali metal alkyl thiosulfate having from 8 to 18 carbon atoms in the alkyl radical.

4. The method which comprises contacting n-dodecyl mercaptan with chlorosulfonic acid in the presence of ether at a temperature of from 0° to 10° C. substantially separating the ether from the resulting reaction product to obtain a residue, neutralizing said residue with sodium hydroxide, and recovering sodium n-dodecyl thiosulfate from the neutalized residue.

5. The method which comprises contacting tert.-dodecyl mercaptan with chlorosulfonic acid in the presence of ether at a temperature of from 0° C. to 10° C., substantially separating the ether from the resulting reaction product to obtain a residue, neutralizing said residue with sodium hydroxide, and recovering sodium tert.-dodecyl thiosulfate from the neutralized residue.

References Cited in the file of this patent

UNITED STATES PATENTS 2,402,642  Lazier et al. _____ June 25, 1956

OTHER REFERENCES

Hickinbottom: "Reactions of Organic Compounds," 2nd ed. 1948, p. 130.

Schwartz & Perry: Surface Active Agents, 1949, pp. 45, 57.

Richter: "Textbook of Organic Chemistry," 3rd ed. 1952, p. 269.

Groggins: "Unit Processes in Organic Synthesis," 4th ed. 1952, p. 593.

Noller: "Chemistry of Organic Compounds," 1952 p. 270.